ERROR-CORRECTING INFORMATION TRANSMISSION SYSTEMS

Filed Feb. 27, 1967

INVENTORS
LEO E. ZEGERS
JAN KUILMAN
BY
[signature]
AGENT

3,526,837
ERROR-CORRECTING INFORMATION TRANSMISSION SYSTEMS

Leo Eduard Zegers and Jan Kuilman, Emmasingel, Eindhoven, Netherlands, assignors, by mesne assignments, to U.S. Philips Corporation, New York, N.Y., a corporation of Delaware Filed Feb. 27, 1967, Ser. No. 618,982
Claims priority, application Netherlands, Feb. 26, 1966, 6602550
Int. Cl. H04l 1/00
U.S. Cl. 325—41 4 Claims

ABSTRACT OF THE DISCLOSURE

In an error correcting system for pulse transmission, coded pulses are transmitted over three channels with different delays. The receiver is provided with delay circuits to eliminate the mutual time differences. Comparison devices are provided to compare the information in the three channels, and to apply the output of one of the channels to a load device when no errors are detected. When errors are detected, the output of a majority decision device receiving information from all three channels is applied to the load device.

The invention relates to an error-correcting information transmission system for the correction of errors in transmitting coded information by means of information pulses from a transmitting station to a receiving station through a transmission path which is subject to disturbances, comprising several transmission channels and pulse-delay circuits, the information being transmitted with mutual time differences in a multiplex form and the received information being delayed mutually to eliminate the mutual time differences, a change-over device being provided in the receiving station which device supplies the information received through either of two transmission channels, or the information received through the other transmission channel, to a pulse processing device after elimination of the mutual time differences, and an error-detection device being provided to detect errors and to control the change-over device.

Such an error-correcting transmission system has already been proposed (U.S. application Ser. No. 437,181, filed Mar. 4, 1965). The proposed transmission system serves for the correction of error accumulations, so-called "error bursts," which occur, for example, in transmitting information through switched telephone connections. In this case, a complete error correction is possible only if an accumulation of errors is succeeded by a guard interval, that is to say, a disturbance-free information interval, of a sufficiently long duration. Errors which occur in the guard intervals are not corrected.

It is the object of the invention to provide an improvement of the error-correcting information transmission system mentioned in the preamble to reduce the possibility of errors in the information transmitted to the information-processing device.

An error-correcting information transmission system according to the invention is characterized in that three transmission channels are provided and the information is transmitted in a triplex form with mutual time differences, the receiving station comprising a majority decision device which combines the pieces of information received through the three channels, after elimination of the mutual time differences, by means of a majority decision to one combined information, the change-over device supplying the combined information or the information first received after elimination of the time difference with the combined information to the pulse-processing device.

Figure 1:
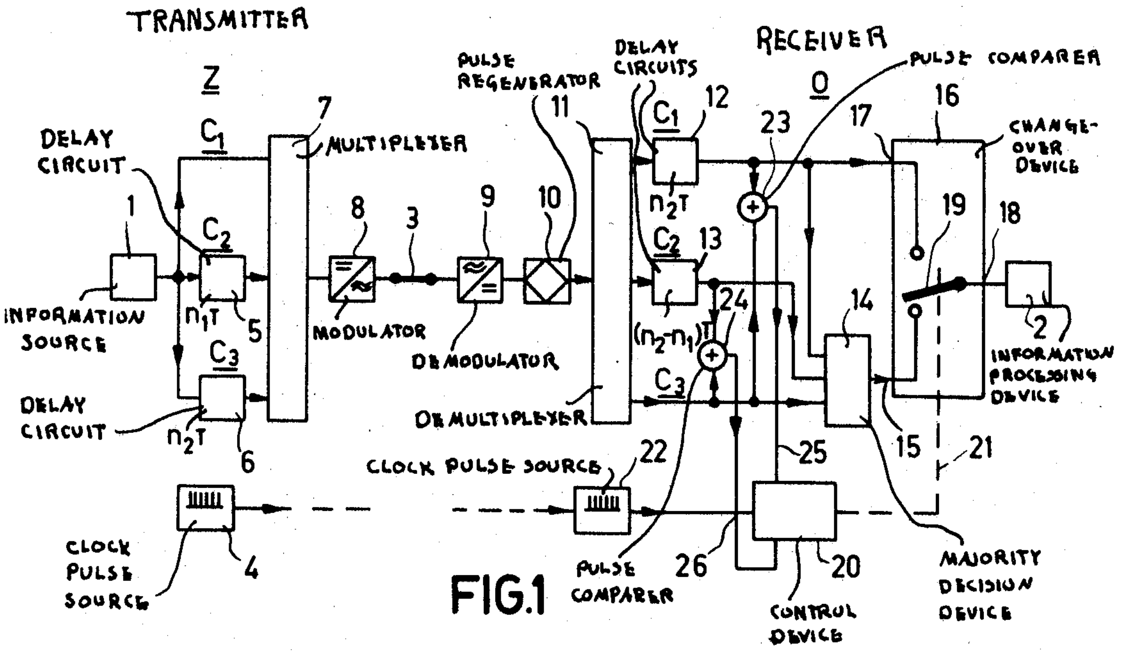
Figure 2:
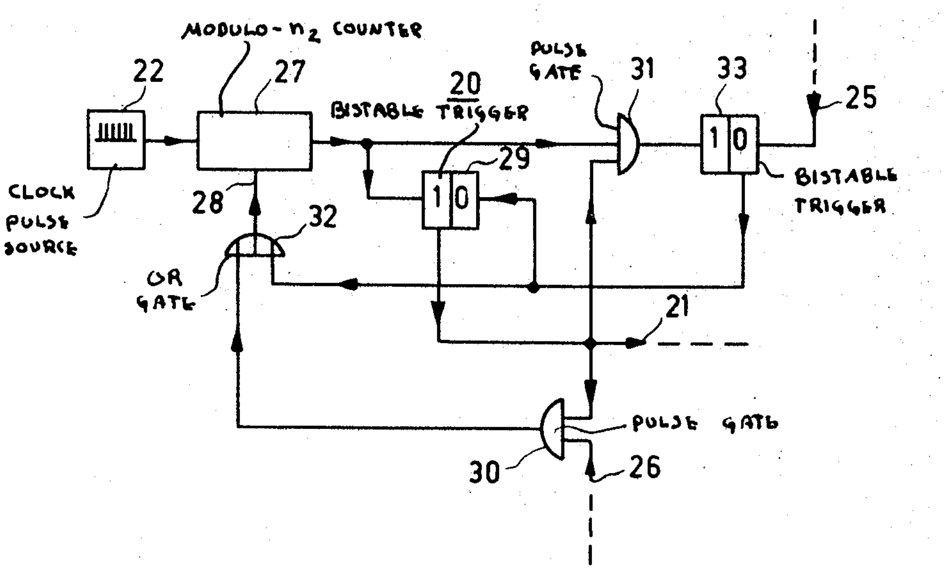

The invention and its advantages will now be described in greater detail with reference to the figures, in which:

FIG. 1 is a block-schematic diagram of an example of a transmission system according to the invention, and FIG. 2 is an embodiment of a control device shown in FIG. 1 by a block.

The block-schematic diagram of the error-correcting information transmission system shown in FIG. 1 serves for the error-free transmission from an information source 1 in a transmitting station Z to an information-processing device 2 in a receiving station O through a transmission path 3. The transmission of information is effected by bivalent information pulses which each represents a binary figure. These information pulses are transmitted in synchronism with a clock-pulse source 4 and with a nominal pulse duration of T sec.

The information of the information source 1 is transmitted three times with mutual time differences, namely once through a transmission channel $C_1$, once through a transmission channel $C_2$ with a delay of $n_1.T$ sec. with respect to channel $C_1$, and once through a transmission channel $C_3$ with a delay of $n_2.T$ sec. with respect to channel $C_1$. The factors $n_2$ and $n_1$ are arbitrary integer numbers, it being assumed that $n_1$ is smaller than $n_2$. The various delays in transmitting are supplied by a pulse delay circuit 5 included in the transmission channel $C_2$ and having a delay time of $n_1.T$ sec. and by a pulse delay circuit 6 included in the transmission channel $C_3$ and having a delay time of $n_2.T$ sec. These pulse delay circuits may be combined by providing the pulse delay circuit 6 with an additional output which supplies a signal which is delayed with respect to the input over a time of $n_1.T$ sec. The three transmission channels $C_1$, $C_2$ and $C_3$ are combined in a multiplexing device 7, for example, a time multiplexing device. The output signal thereof is applied to a modulator 8 which converts the multiplex signal into a modulated signal suitable for the transmission path 3. In the receiving station O, the received modulated signal is demodulated by a demodulator 9 and the multiplex signal is regenerated from the demodulated signal by a pulse regenerator 10. The three combined channels are divided by a demultiplexing device 11 which is synchronized with the multiplexing device 1 is a manner which is not further shown.

The information received through the three channels $C_1$, $C_2$ and $C_3$ is shifted in time before being further conducted in such manner that the mutual time differences are eliminated; in fact, the information received through channel $C_1$ is delayed over a time $n_2.T$ sec. with respect to channel $C_3$ and the information received through the channel $C_2$ is delayed over a time $(n_2-n_1).T$ sec. with respect to channel $C_3$. The various delays in receiving are supplied by the pulse delay circuit 12 which is included in the receiving channel $C_1$ and has a delay time of $n_2.T$ sec. and by a pulse delay circuit 13 which is included in the receiving channel $C_2$ and has a delay time of $(n_2-n_1).T$ sec. The three pieces of information received are applied, after elimination of the mutual time differences, to a majority decision device 14. This device applies corrected information which is formed by a majority decision of the three pieces of information presented. Accordingly, the device 14 supplies, for every three information pulses supplied simultaneously, one information pulse of the same value as of the majority of the supplied information pulses. The corrected information supplied by the device 14 is applied to a first input 15 of a change-over device 16 and the information received through the channel $C_1$ is applied after elimination of the time difference with the other pieces of information received to a second input 17 of the change-over device 16. The information-processing device 2 is connected to an output 18 of the change-over device 16. This device is diagrammatically shown by a switch arm 19 which has two positions which, in the position shown—hereinafter termed rest-position—connects the input 15 to the output 18 and which, in the other position—hereinafter termed working position—connects the input 17 to the output 18. Normally disturbances on transmission path 3 will affect all three channels. The errors caused thereby will be detected in channel $C_3$ first, because in the receiver there is no delay in these channels. An error in channel $C_3$ is detected by both adder 23 and adder 24 causing coincident error signals to occur on lines 25 and 26. When such error signals appear after a disturbance free interval of at least $n_2.T$ sec. in line 26 up to the time of the present error, the device 16 is switched to the "work" condition. This is more fully explained below.

The correction of errors is partly realized by the changing over of the change-over device 16 between the inputs 15 and 17. The change-over is controlled by the control device 20 through the broken line 21. The control device 20 is connected to a clock-pulse source 22 having a cycle duration of T sec. which is synchronized with the clock-pulse source 4 in the transmitting station Z in a manner which is not further shown. For the detection of errors the three pieces of information received are compared two by two by the pulse comparison devices 23 and 24 after elimination of the mutual time differences. The pulse comparison device 23 compares the information received through the channel $C_1$ pulse by pulse with the information received through channel $C_3$ and the pulse comparison device 24 compares the information received through the channel $C_2$ pulse by pulse with the information received through the channel $C_3$. Every pulse comparison device supplies an error indication pulse for every two information pulses presented simultaneously for comparison and the values of which do not correspond. Accordingly, the pulse comparison devices may be realized by a modulo-2 adder. The adder indication signal of the pulse comparison device 23 is applied through a line 25 to the control device 20 and the error indication signal of the pulse comparison device 24 is applied through a line 26 to the control device 20. If an error indication pulse occurs at the line 25, the control device 20 will switch the change-over device 16 from the input 15 to the input 17 if at least no error indication pulses have occurred at line 26 during a time interval of the same duration as the delay time of the pulse delay circuit 12 in the receiving channel $C_1$. After changing over the control device 20 holds the change-over device 16 in the working position during a time interval of the same duration as the delay time of the pulse delaying circuit 12. After termination of this time interval the control device 20 swtiches the change-over device 16 back to the rest position. A disturbance in the transmission path 3 wtih a maximum time duration of $n_2.T$ sec., namely the delay time of the pulse delay circuit 12, is then fully eliminated from the information applied to the pulse-processing device 2. The delay time of $n_2.T$ sec., can be adapted to the anticipated duration of the disturbance by a choice of $n_2$ in relation to the pulse duration of T sec. After the change-over device 16 is reset to the rest position, it is locked in the rest position for a locking time interval of $n_2.T$ sec. after the instant of change-over and after the instant of occurring of every error indication pulse in the line 26, and is unlocked only if during a time interval of at least $n_2.T$ sec. no error indication pulse have occurred in pulse line 26. The change-over device 16 can change over to the working position only then when the information in the pulse delay circuit 12 is disturbance-free. Errors which occur during the time that the change-over device 16 is locked in the rest position, are not corrected by the change-over device 16. During the locking time of the change-over device 16, the majority decision device 14 has an error-correcting effect; in fact, this device effects, on the basis of the majority decision of the three pieces of information presented, a considerable reduction of the possibility of errors. The delay time of $(n_2-n_1).T$ sec. of the pulse delay circuit 13 in the receiving channel $c_2$ is chosen in accordance with the anticipated disturbances in the transmission path 3 to realize an optimum error detection and is perferably chosen to be as small as possible to reduce the locking time of the change-over device 16. In fact, an interference in the transmission path 3 is detected twice by the pulse comparison device 24 with a mutual time difference of $(n_2-n_1).T$ sec. and in both cases supplies error indication pulses. A reduction of this mutual time difference supplies a reduction of the locking time of the change-over device 16. To illustrate the above, a few data are given below of a realized error-correcting information transmission system destined for the transmission of information through a switched telephone connection:

Transmission speed per channel: 800 bauds
$n_2=1024$
$n_2-n_1=32$
Average possibility of errors: $10^{-3}$ to $10^{-4}$
Average possibility of errors after error-corection: $10^{-6}$ to $10^{-8}$.

In the present error-correcting information transmission system two error-correction methods are used in combination. The first correction method, namely the change-over method, is particularly suitable for correcting error accumulations which occur again and again and which are the result, for example, of line interruptions. The second correction method is particularly suitable for correcting errors occurring at random. As a result of the combined use of the two correction methods, as described, an automatic adaptation to the type of disturbance occurs. If the change-over method is used the delay time of $n_2 \cdot T$ sec. may not be chosen to be too large, since with such a large delay time the possibility of a disturbance-free safety interval after termination of the anticipated duration of the disturbance is small. The present transmission system renders it possible to choose the delay time of $n_2 \cdot T$ sec. to correct long disturbances to be large, since the remaining errors will be corrected by means of the second correction method. The correction of error accumulations as a result is made independent of the occurrence of disturbance-free safety intervals, after termination of every error accumulation.

FIG. 2 shows the control device 20 in greater detail. This device comprises a modulo-$n_2$ counter 27 connected to the clock-pulse source 22 and comprising a resetting input 28. A resetting pulse applied to said input sets the counter in the zero position. If no resetting pulses are applied to the resetting input 28, the counter supplies an output pulse after $n_2$ clock pulses, that is to say after a time interval of $n_2 \cdot T$ sec. This output pulse is applied to the bistable trigger circuit 29 and sets it in the condition 1, it being assumed that the trigger circuit originally was in the condition 0. The change-over device 16 is controlled by the circuit 29 and is in the working position if the trigger circuit 29 is in the condition 0 and is in the rest condition if the trigger circuit 29 is in the condition 1. Accordingly, the change-over device is changed over from the working position to the rest position if the trigger circuit 29 is set in the condition 1. The trigger circuit 29 controls two pulse gates 30 and 31 which are conducting if the trigger circuit is in the condition 1. After the trigger circuit 29 is set in the condition 1, the pulse gate 30 passes the error indication pulse applied to line 26 which pulses are applied through an OR-gate 32 to the resetting input 28 of the counter 27. Each of these error-indication pulses sets the counter in the zero condition. The counter produces an output pulse only if during a time interval of $n_2 \cdot T$ sec. no error indication pulses are applied to the pulse line 26. The output pulse of the counter 27 which occurs after such a disturbance-free time interval is passed by the pulse gate 31 to a bistable trigger circuit 33 and sets it in the condition 1, it being assumed that the trigger circuit originally was in the condition 0. The error indication pulses applied through pulse line 25 are applied to the trigger circuit 33 and set it in the condition 0. If the trigger circuit 33 has been set in the condition 1 and is reset in the condition 0, the trigger circuit produces an output pulse. This output pulse is applied to the trigger circuit 29 and sets it in the condition 0 and is then applied, through OR-gate 32, to the resetting input 28 of the counter 27 and sets it in the zero condition. The trigger circuit 29, on being reset in the condition 0, switches the change-over device 16 to the working position and cuts off the pulse gates 30 and 31. The counter 27 supplies after a time interval of $n_2 \cdot T$ sec. an output which sets the trigger circuit 29 in the condition 1. The trigger circuit 29, when it is set in the condition 1, changes over the change-over device 16 again back to the rest condition. The change-over device remains locked in this condition until the trigger circuit 33 is set again in the condition 1. This is the case if after reaching the rest condition, a disturbance-free time interval of at least $n_2 \cdot T$ sec. occurs.

What is claimed is:

1. An error-correcting information transmission system for the correction of errors in transmitting coded information by means of information pulses from a transmitting station to a receiving station through a transmission path which is subject to disturbances, comprising at least three transmission channels having respective pulse delay circuits, the information being transmitted in a multiplex form with mutual time differences, the receiving station comprising means for eliminating said mutual time differences including delaying means in each of said channels, a change-over device which supplies the information received either from two transmission channels, or the information received from the remaining transmission channel after elimination of the mutual time differences, a pulse-processing device and an error detection device being provided to detect errors and to control the change-over device, the receiving station comprising a majority decision device which combines the information received through the three channels after elimination of the mutual time differences by means of a majority decision to one combined information, the change-over device applying either the combined information of the information in the first received channel after elimination of the time difference with respect to the combined information to the pulse-processing device.

2. An error-correcting information system as claimed in claim 1, wherein the receiving station comprises a control device means for changing over the change-over device from a rest position to a working position after detecting an error and for changing over the changeover device from the working position to the rest position a predetermined time interval after the first change-over and for locking the change-over device in the rest position a predetermined time interval after the second change-over and after detecting an error, wherein the change-over device in the rest position applies the combined information and in the working position applies the information first received after elimination of the time difference with respect to the combined information to the pulse-processing device.

3. An error-correcting information transmission system as claimed in claim 2, wherein the error detection device comprises a pulse comparison device which compares the last received information and the penultimately received information after elimination of the mutual time difference pulse by pulse and supplies an error indication pulse for every two compared pulses which do not correspond, the control device comprising a time measuring device responding in the rest position of the change-over device to the error indication pulse to determine the locking interval and that the time measuring device is reset in an initial position by error indication pulse.

4. An error correction transmission system comprising means for transmitting information in at least three transmission error producing channels with different respective time delays, means for receiving said transmitted information in said channels, means for inversely delaying said respective received channels to cause said channels to be in time coincidence, means for deciding the error-free output by majority logic having three inputs coupled to said received channels respectively, and an output, an output change over switch having two inputs, one input being coupled to said output of said majority logic means and the other input being coupled to one of said received channels respectively, means for detection of a transmission errors coupled to said received channels, and means for controlling said output change over switch when a transmission error has occurred.

References Cited

UNITED STATES PATENTS

| | | | |
|---|---|---|---|
| 3,197,563 | 7/1965 | Hamsher et al. | |
| 3,422,357 | 1/1969 | Browne | 325—56 X |
| 2,803,703 | 8/1957 | Sherwin | 178—70 |
| 2,880,275 | 3/1959 | Kahn | 179—15 |
| 3,409,875 | 11/1968 | De Jager et al. | 340—146.1 |

RICHARD MURRAY, Primary Examiner

B. V. SAFOUREK, Assistant Examiner

U.S. Cl. X.R.

178—69; 325—59; 340—146.1

PO-1050
(5/69)

UNITED STATES PATENT OFFICE
CERTIFICATE OF CORRECTION

Patent No. 3,526,837 Dated September 1, 1970

Inventor(s) LEO EDUARD ZEGERS ET AL

It is certified that error appears in the above-identified patent and that said Letters Patent are hereby corrected as shown below:

col. 2, line 43, cancel "1" and insert -- 7 --;

Signed and sealed this 8th day of October 1974.

(SEAL)
Attest:

McCOY M. GIBSON JR.
Attesting Officer

C. MARSHALL DANN
Commissioner of Patents